US006817812B1

(12) United States Patent
Christian

(10) Patent No.: US 6,817,812 B1
(45) Date of Patent: Nov. 16, 2004

(54) METHOD OF FASTENING PNEUMATIC TUBING

(75) Inventor: Todd Christian, Wadsworth, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/462,943

(22) Filed: Jun. 16, 2003

Related U.S. Application Data

(60) Provisional application No. 60/389,645, filed on Jun. 17, 2002.

(51) Int. Cl.[7] ............................................. B65G 53/00
(52) U.S. Cl. ...................... 406/197; 406/191; 138/155
(58) Field of Search ................................. 406/191, 192, 406/193, 194, 195, 196, 197; 138/155

(56) References Cited

U.S. PATENT DOCUMENTS

| 3,046,938 | A | * | 7/1962 | Perkins ...................... 118/506 |
| 3,368,849 | A | * | 2/1968 | Cheely ....................... 406/194 |
| 3,529,664 | A | * | 9/1970 | Baker et al. ................. 165/178 |
| 3,703,190 | A | * | 11/1972 | Schoeffler ................... 137/375 |
| 4,455,112 | A | * | 6/1984 | Anders ........................ 406/110 |
| 4,715,749 | A | * | 12/1987 | Hoppe et al. ................. 406/14 |
| 4,976,288 | A | * | 12/1990 | Steele et al. ................. 138/120 |
| 5,181,806 | A | * | 1/1993 | Grosswiller et al. ......... 406/189 |
| 6,029,505 | A | * | 2/2000 | Webb ....................... 73/40.5 R |
| 6,729,808 | B1 | * | 5/2004 | Nelson ........................ 406/11 |

* cited by examiner

Primary Examiner—Joseph Dillon, Jr.
(74) Attorney, Agent, or Firm—Ralph E. Jocke; Daniel D. Wasil; Walker & Jocke

(57) ABSTRACT

A pneumatic transfer system (10) includes a service provider station (12) and a customer station (14). A carrier is movable through a transfer conduit (26) between the stations responsive to differential pressure. The transfer conduit (26) comprises tubing (40, 42) fastened together by a clamp apparatus (70). The clamp apparatus includes a band portion (72), a retainer portion (74), and an adjusting device (76). The band portion is able to be tightened by use of the adjusting device. The retainer portion includes tapered walls (92). The clamp apparatus is able to be initially positioned so that portions of tube flanges (44, 46) are disposed within the retainer portion. A resilient seal (100) may also be used. Tightening of the clamp results in the tube flanges being guided toward both longitudinally abutting contact and circumferential alignment. The clamp permits the guiding, aligning, sealing, and retaining of pneumatic tube flanges.

34 Claims, 6 Drawing Sheets

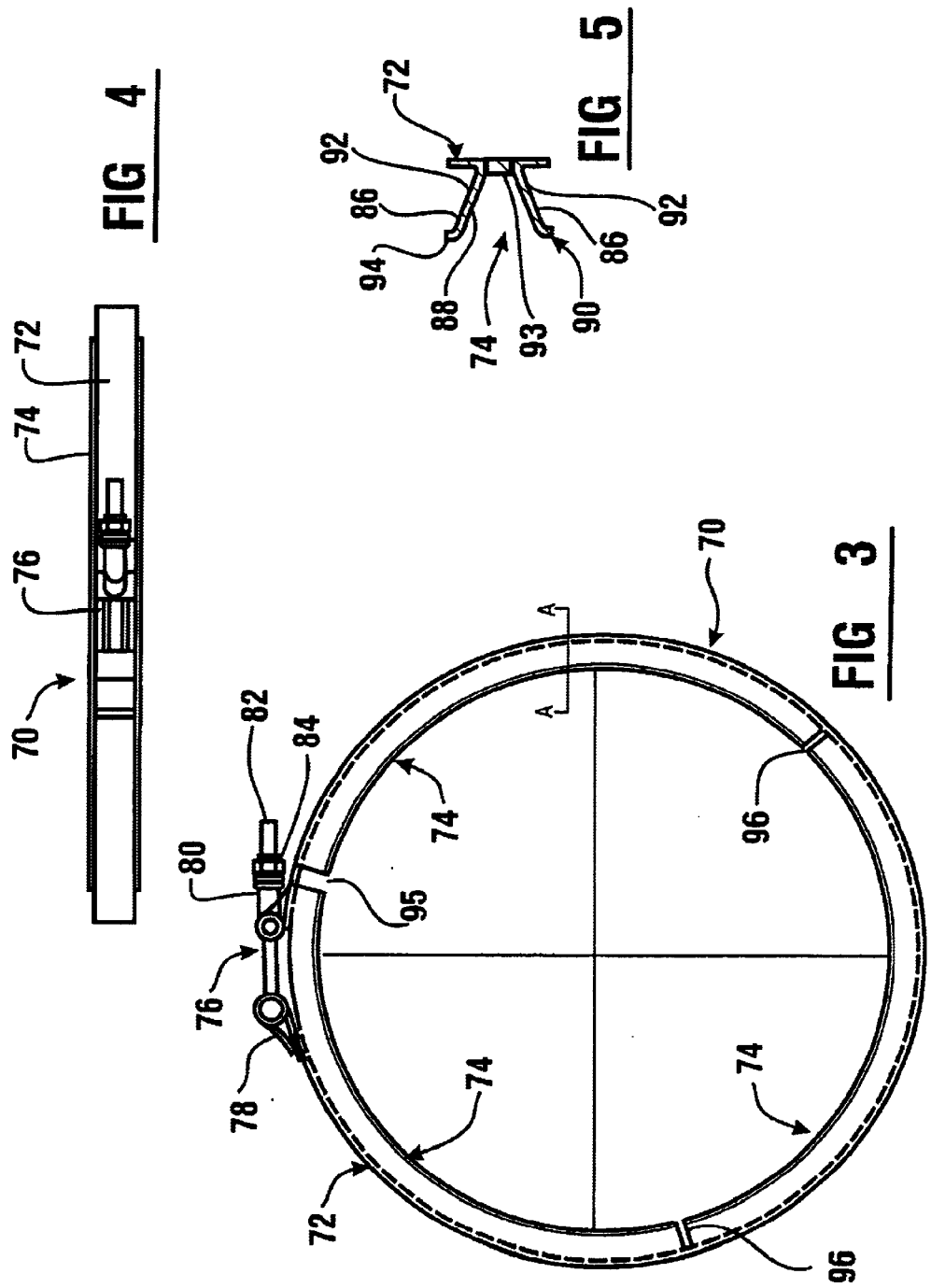

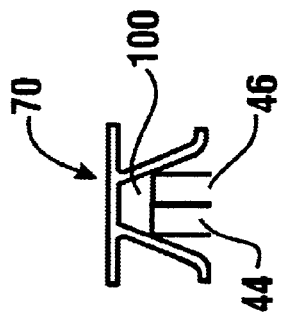
FIG 8
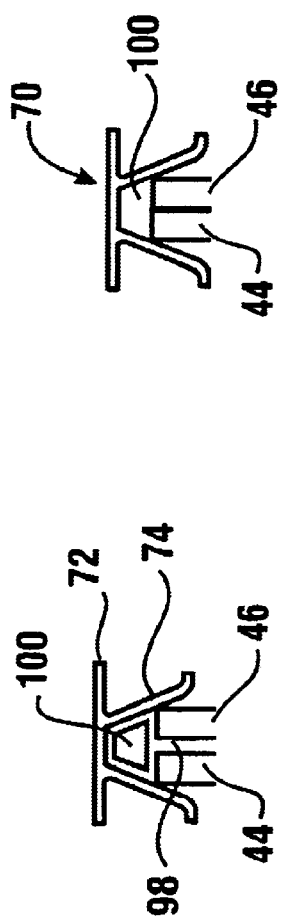
FIG 7
FIG 9
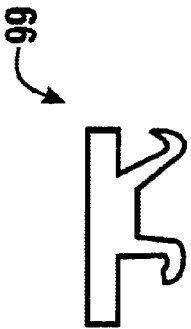
FIG 11
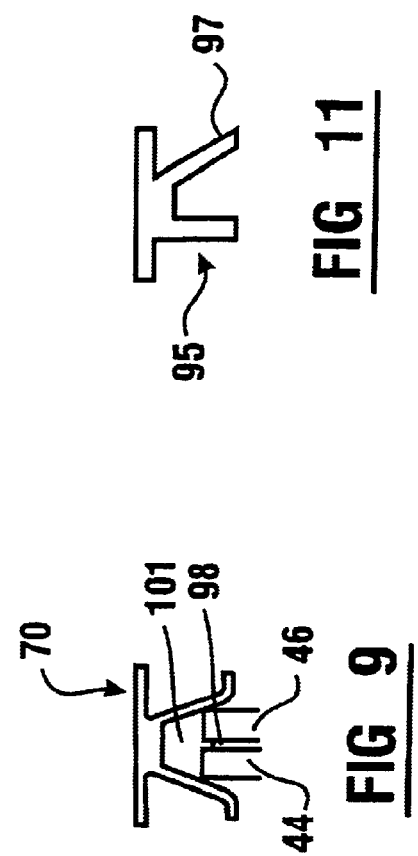
FIG 12

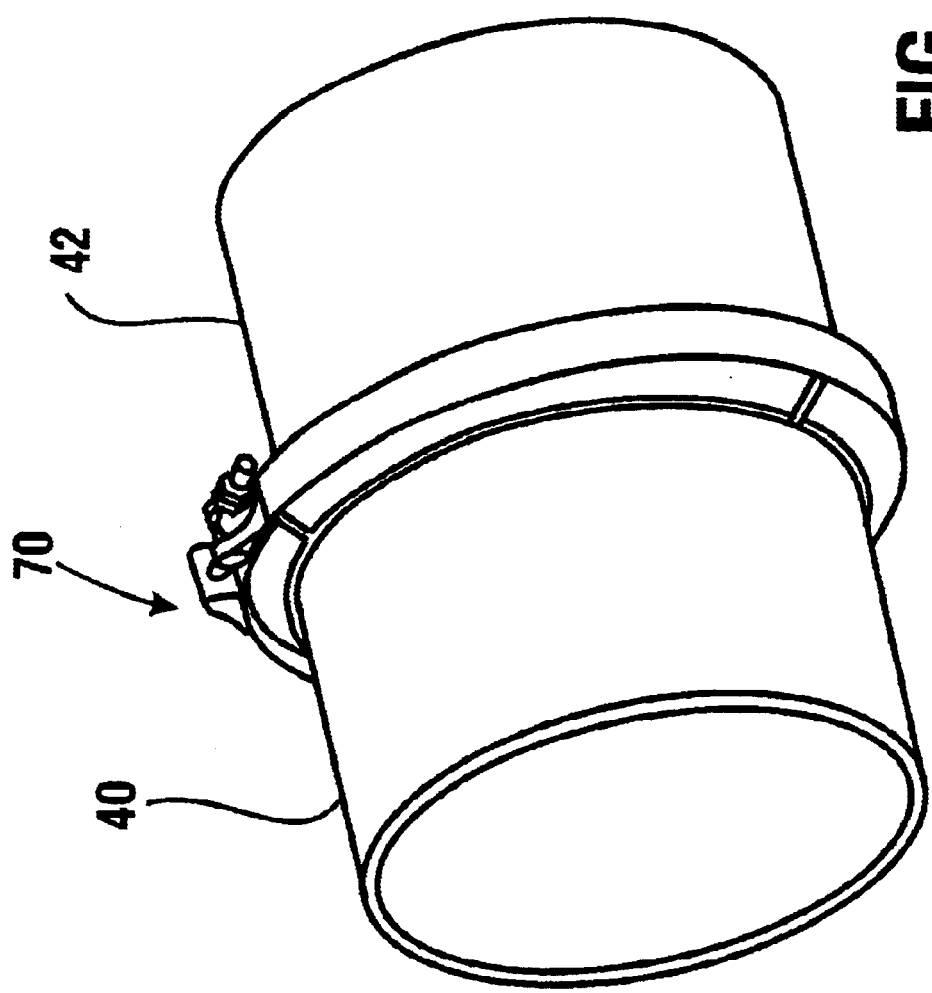

METHOD OF FASTENING PNEUMATIC TUBING

CROSS REFERENCE TO RELATED APPLICATION

This application claims the benefit of U.S. Provisional Application No. 60/389,645, filed Jun. 17, 2002.

TECHNICAL FIELD

This invention relates to pneumatic tube systems and to an apparatus and method for fastening pneumatic tubing used in such systems. The pneumatic tubing is used for transporting items from one location to another by differential pressure. Specifically, this invention relates to an apparatus and method for fastening sections of such pneumatic tubing.

BACKGROUND ART

Systems which transport items between stations by pneumatic pressure are known in the prior art. Some prior art transfer systems include pneumatic tubing in which items are moved between a service provider station and a customer station in a carrier that is moved through a transfer conduit. The carrier is moved through the transfer conduit responsive to differential pressure that is selectively produced in areas of the conduit. The differential pressure is commonly produced by producing negative pressure in the area into which the carrier is to be moved, and/or by producing a positive pressure in the area behind the carrier, or both. In either event the relative differential pressure between the areas in front and behind the carrier propels it through the transfer conduit. Systems of this type are commonly provided in drive-through banking applications by Diebold, Incorporated, the Assignee of the present invention. An example of such a system is shown in U.S. Pat. No. 5,299,891, the disclosure of which is incorporated herein by reference. Another example of a pneumatic transfer system is shown in U.S. Pat. No. 6,146,057, the disclosure of which is incorporated herein by reference.

In prior art pneumatic transfer systems the connecting or fastening together of the individual tubes for use in the pneumatic system can be time consuming and difficult. Large clamps and large seals involving numerous components are often needed to hold the tubing sections together. The size and weight of the tubing sections and clamps can make proper tube alignment difficult during handling and clamping. Thus, without proper sealing alignment the clamped tubing sections are susceptible to misalignment and leakage of differential pressure which is undesirable for efficient transfer of the carrier during operation.

Thus, there exists a need for a pneumatic tubing fastening apparatus and process in which the fastening clamp itself contributes to the proper alignment of the tubes during fastening. There further exists a need for a process that produces a more efficient and economical pneumatic tubing fastening.

DISCLOSURE OF INVENTION

It is an object of an exemplary form of the present invention to provide an apparatus and method for fastening pneumatic tubing.

It is a further object of an exemplary form of the present invention to provide a method of fastening pneumatic tubing with a clamp apparatus which contributes to tubing alignment during the fastening.

It is a further object of an exemplary form of the present invention to provide a method of fastening pneumatic tubing with a clamp apparatus having a tapered portion for guiding a first tube flange and a second tube flange longitudinally toward each other during the fastening.

It is a further object of an exemplary form of the present invention to provide a method of fastening pneumatic tubing with a clamp apparatus having at least one retainer portion for guiding a first tube flange and a second tube flange toward circumferential alignment during the fastening.

It is a further object of an exemplary form of the present invention to provide a method of fastening pneumatic tubing for a pneumatic transfer apparatus for transporting items between a first station and a second station.

It is a further object of an exemplary form of the present invention to provide a method of fastening pneumatic tubing for a pneumatic transfer apparatus for transporting an item carrier between a first user station and a second user station.

It is a further object of an exemplary form of the present invention to provide a method of fastening pneumatic tubing which is reliable and economical.

Further objects of exemplary forms of the present invention will be made apparent in the following Best Mode for Carrying Out Invention and the appended claims.

The foregoing objects are accomplished in one exemplary form of the invention by an apparatus and method for fastening together sections of pneumatic tubing. The pneumatic tubing includes a first pneumatic tube portion having a first flange and a second pneumatic tube portion having a second flange. The first flange includes a first flange face and the second flange includes a second flange face. The first flange further includes a first outer circumferential edge and the second flange further includes a second outer circumferential edge. The first flange extends about a first longitudinal axis and the second flange extends about a second longitudinal axis.

A clamp apparatus includes a circumferential band portion, at least one retainer portion, and an adjusting device. The adjusting device is in operative connection with the band portion. Each retainer portion includes in cross section a pair of spaced walls, at least one of which includes a tapered portion. Tightening of the adjusting device results in tightening of the clamp apparatus by reducing the diameter of the area bounded by the circumferential band portion.

The exemplary form of the fastening method includes positioning the first and second tubing portions with the first and second flange portions in generally opposed, abutting relation such that the first and second circumferential axes are generally in alignment. The clamp apparatus is positioned adjacent the first flange and the second flange so that at least a portion of the first flange and at least a portion of the second flange are disposed between the spaced walls of the retainer portion. The method further includes tightening the adjusting device so that the tapered portion longitudinally urges the first flange face and the second flange face to move relatively toward an abutting relationship with each other. Tightening the adjusting device causes the at least one retainer portion to urge the first edge and the second edge toward circumferential alignment.

The exemplary method also provides for sealing of the portions of the adjacent pneumatic tubing sections in generally air-tight relation. A resilient seal is positioned in intermediate relation of the band portion and the first and second flanges. During the tightening of the clamp apparatus the seal is urged into abutting relation with the adjacent flange edges resulting in the first flange becoming sealed in fluid tight relation with the second flange. As a result significant differential pressure within the interior area of the tube is not lost in the area of the joint and the tubing portions are aligned to minimize discontinuities in the interior of the tubing wall on which a passing carrier may catch or which may damage seals on a moving carrier.

The apparatus and method of the exemplary embodiment provide for aligned and sealed pneumatic tubing sections for a pneumatic transfer apparatus for transporting a carrier between a first user station and a second user station. A transfer conduit including the fastened pneumatic tubing extends between a service provider station and a customer station. A differential pressure generating mechanism is connected to the transfer conduit so as to selectively provide a relatively lower pressure in the conduit adjacent to either the service provider station or the customer station. A carrier is movable in response to differential pressure between the service provider station and the customer station. Items may be carried on or within the carrier between the service provider and the customer for purposes of carrying out transactions such as financial transactions.

BRIEF DESCRIPTION OF DRAWINGS

FIG. 3 shows an exemplary embodiment of a clamp apparatus used in an exemplary form of the present invention.

FIG. 4 is a top view of the clamp apparatus of FIG. 3.

FIG. 5 is a cross-sectional view taken along A—A of FIG. 3.

FIG. 7 is a cross-sectional view showing a portion of first and second flanges positioned between tapered walls of a retainer portion of a clamp portion.

FIG. 8 is a cross-sectional view showing flanges fastened in abutting relationship and circumferential alignment by a clamp apparatus.

FIG. 9 is a cross-sectional view showing fastened flanges with a seal portion therebetween.

FIG. 10 shows pneumatic tubes fastened by a clamp apparatus in accordance with an exemplary embodiment.

FIG. 11 shows a cross-sectional view of an exemplary clamp apparatus having a single tapered wall with a straight end portion.

FIG. 12 shows a cross-sectional view of an exemplary clamp apparatus having a single tapered wall with a rounded end portion.

BEST MODE FOR CARRYING OUT INVENTION

Figure 1:
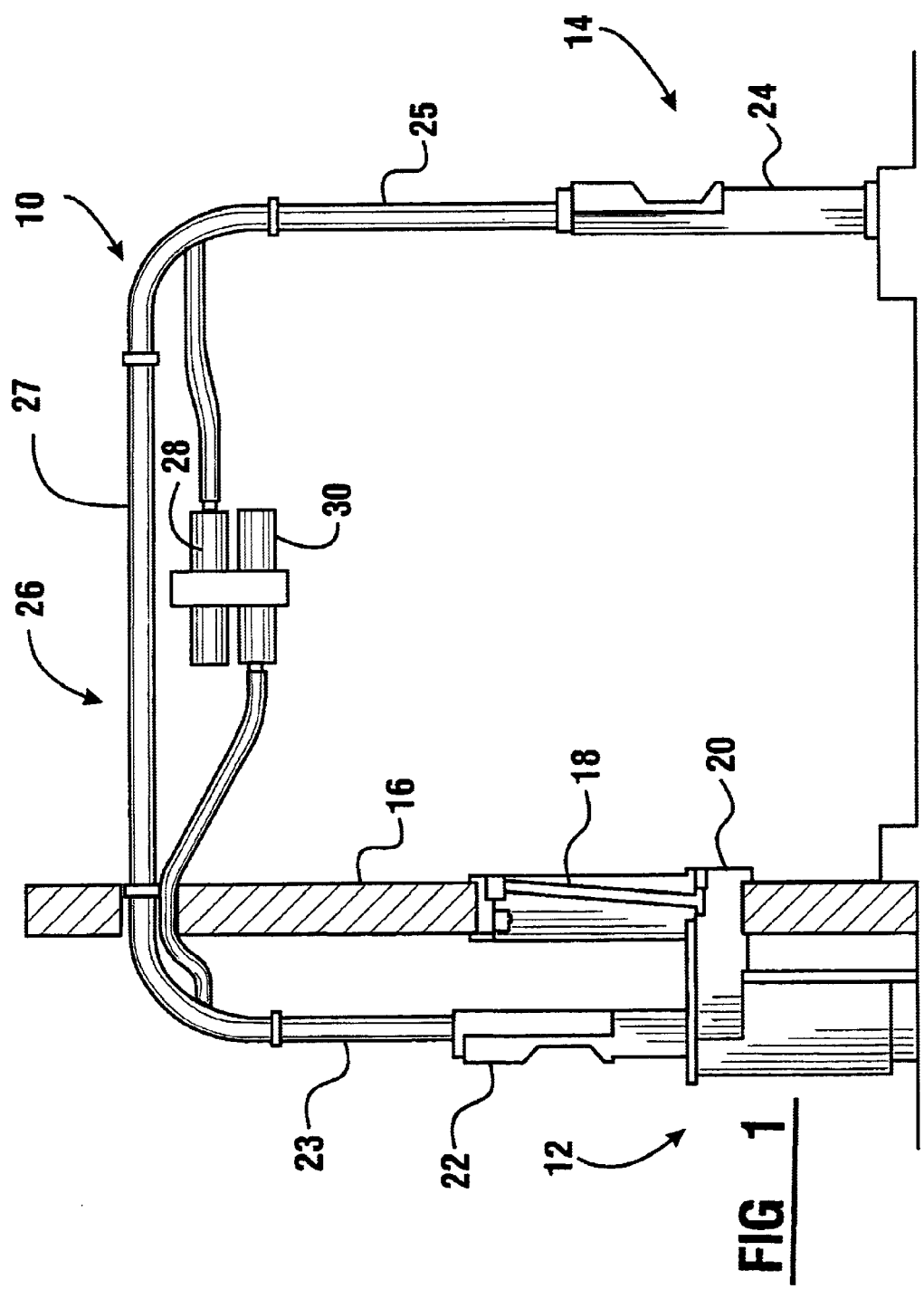
FIG. 1 is a schematic view of a pneumatic transfer apparatus having pneumatic tubing fastened by an exemplary embodiment of the present invention.

Referring particularly to FIG. 1, there is shown a pneumatic transfer apparatus having pneumatic tube portions or sections fastened together by an exemplary apparatus and method of the present invention. The pneumatic transfer system 10 includes user stations, such as a service provider station 12 and a customer station 14. In the exemplary embodiment shown, the service provider station 12 is preferably operated by a bank teller, pharmacist, cashier, or other personnel in a bank, pharmacy, store, or similar establishment. The customer station 14 in the embodiment is at a drive-through or walk-up location located outside the facility in which the service provider station 12 is operated. Of course, the pneumatic transfer system may be used in many other transaction environments as well, such as in gaming, ticketing, vending, and other sales or service facilities.

System 10 may be installed through a building wall 16, which may be an exterior building wall of a bank, drugstore, store, or other building. The wall 16 may have installed therein a drive-through window 18 which enables a service provider such as a cashier or other personnel to observe customers at the customer station. The service provider station also includes a retractable drawer mechanism 20, which a service provider may selectively extend or retract to exchange items or documents with customers. Such drawer mechanisms are commercially available from Diebold, Incorporated, the Assignee of the present invention. In the embodiment of the system 10 shown in FIG. 1, the drawer mechanism 20 may be used to exchange items with a customer who is adjacent to the window 18 either in a car or otherwise. The system 10 may be concurrently used by a service provider at a service provider station 12 to exchange items with a further customer at another customer station. That is, the system may be arranged so that a single service provider can simultaneously service different customers located at different customer stations. It should be understood however that in other embodiments other configurations for service provider and customer stations may be used.

The service provider station 12 includes a service provider terminal 22. Customer station 14 includes a customer terminal 24. Terminals 22 and 24 are connected by pneumatic tubing forming a transfer conduit 26. Transfer conduit 26 includes a first generally vertically extending leg portion 23 which is in communication with the service provider station 22. Transfer conduit 26 further includes a second generally vertically extending leg portion 25 which is in communication with the customer station 24. A transversely extending leg portion 27 extends generally horizontally between the first and second leg portions. The transverse portion 27 is connected to the leg portions through radiused bends in the conduit which are suitably radiused to enable the passage of a carrier therethrough. The transfer conduit 26 may be sealed to permit use of a differential pressure in areas within the interior of the conduit to pneumatically transport the carrier therethrough. The carrier may be used to transfer items used or exchanged in transactions.

Of course it should be understood that in other embodiments transfer conduit 26 may comprise more or less leg portions and radiused bends. Furthermore, a leg portion may be connected or fastened to an adjacent leg portion without the use of radiused bends. For example, a straight portion may be fastened to another straight portion to form a vertical leg portion.

FIG. 1 also shows a first blower 28 connected to transfer conduit 26 generally in the area above customer terminal 24. Blower 28 may be selectively operated to draw a negative pressure relative to ambient in the transfer conduit in the area generally above the customer terminal. Blower 28 further includes suitable valving so that when the blower 28 is not operated, air is generally prevented from entering the transfer conduit 26 through the blower 28. A blower 30 similar to the blower 28 is connected to the transfer conduit in an area generally above service provider terminal 22. Blower 30 may be operated to selectively produce a negative pressure in the transfer conduit above the service provider terminal. Like blower 28, when blower 30 is not operating, air is generally prevented from entering the transfer conduit through the blower.

Figure 2:
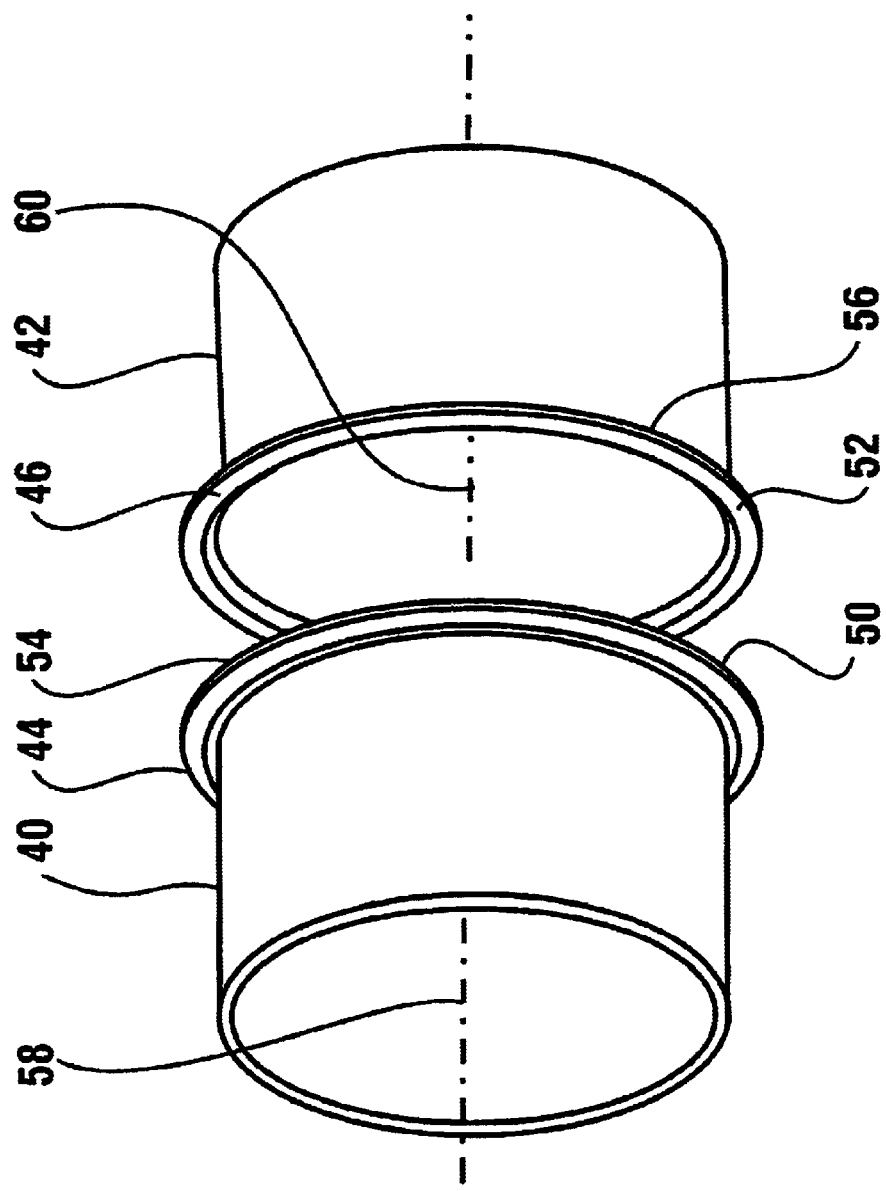
FIG. 2 shows exemplary unfastened pneumatic tube portions.

The pneumatic tubing leg portions may be fastened together, aligned and sealed through use of an exemplary embodiment of the present invention. FIG. 2 shows two unfastened pneumatic tubing portions. The pneumatic tubing includes a first pneumatic tube portion 40 having a first flange 44 and a second pneumatic tube portion 42 having a second flange 46. The first flange 44 has a first flange face 50 and the second flange 46 has a second flange face 52. The first flange 44 also has a first outer circumferential edge 54 and the second flange 46 also has a second outer circumferential edge 56. In an exemplary embodiment of the invention, the flanges are substantially identical, e.g., solid and having the same diameter and width. The flanges include openings therethrough which in the exemplary embodiment are generally aligned with the surface bounding the interior of the tube through which the carrier passes. The first flange 44 extends about a schematically shown first longitudinal axis 58 and the second flange 46 extends about a schematically shown second longitudinal axis 60. The pneumatic tubing comprises a material permitting adjacent flanges to be clamped together, for example the pneumatic tubing portions may be comprised of metal such as aluminum or stainless steel. Other embodiments may be comprised of plastic material. Still other embodiments may be comprised of another material which permits holding of a relative differential pressure therein. The tube flanges may be the result of flared tubing, welding, molding, or other metallurgical or plastic forming methods. Exemplary embodiments may fasten tube portions together of the same or different materials. As discussed in more detail herein, the exemplary form of the present invention enables fastening of the pneumatic tube portions 40, 42 in an aligned, sealed, and secured manner.

FIG. 3 shows an exemplary embodiment of a clamp apparatus 70 for use in fastening pneumatic tubing. The exemplary clamp apparatus 70 includes a band portion 72, a retainer portion 74, and an adjusting device 76. FIG. 4 is a top view of the clamp apparatus of FIG. 3. FIG. 5 is a view taken along A—A of FIG. 3. FIG. 5 shows a segment of the band portion 72 and retainer portion 74.

The band portion 72 substantially forms and bounds the outer circumference of the clamp. The circumferential band portion can be comprised of a material providing clamping strength therewith yet also preferably enabling bending or flexing thereof, such as a suitably strong metal or plastic. For example, the band portion may be comprised of a metal such as aluminum or stainless steel. The band portion is of a substantially cylindrical shape which can be tightened or loosened by using the adjusting device 76. That is, the diameter of the area bounded by the band portion can be adjusted by using the adjusting device. During tightening of the clamp apparatus (via actuation of the adjusting device), the diameter of the band portion can be reduced. Thus, the band portion can be tightened to produce a clamping force on one or more pneumatic tube flange portions positioned interiorly of the clamp.

The adjusting device 76 is in operative connection with the band portion 72 and is operative to change the size of the area bounded by the band portion. In an exemplary embodiment the adjusting device 76 includes one or more saddle latches 78, at least one trunnion 80, at least one bolt 82, and at least one nut 84. The band portion 72 has two,(open) ends which can be engaged with (or overlap) each other via the adjusting device 76. The saddle latch may be connected to the band portion by nuts and bolts, screws, welding, molding, or other known methods of mechanically connecting. Rotation of the nut 84 relative to the bolt 82 can result in tightening or loosening of the band portion. Thus, the nut 84 can be rotated to pull the ends of the band portion closer together to produce a clamping force.

The exemplary retainer portion 74 is positioned radially interiorly of and supported by the band portion 72. The retainer portion may be supported relative to the band portion in a number of different manners. The retainer portion may be operatively connected to the band portion. For example, the retainer portion may be integral with the band portion; the retainer portion may be formed as a one piece unitary body with the band portion; or the retainer portion may be mechanically or metallurgically fastened to the band portion. For further example, the retainer portion may be welded to the band portion. The retainer portion 74 may comprise a material similar to the band portion material or the tube material. For example, the retainer portion may be comprised of metal such as aluminum or stainless steel.

The exemplary retainer portion 74 includes in cross section a pair of spaced walls 86. At least one of the walls includes a tapered portion 88. In an exemplary embodiment, the spaced walls 86 comprise a V-shaped guide portion 90 having two tapered arms 92, each with equal angles relative to the band portion, such as shown in FIG. 5. Other exemplary embodiments, such as shown in FIG. 11, may use a retainer portion 95 having only one tapered wall 97. FIG. 12 also shows an exemplary cross section of a clamp apparatus 99 having a single tapered wall. Still other embodiments may have spaced walls which taper at different angles relative to the hand portion. Further embodiments may have more or less than two spaced walls. Of course it should be understood that a reference to a wall as used herein may comprise a projection or protuberance extending in a direction away from the band portion. Such a wall may in some embodiments even be created by a groove or slot in the band portion.

The portion of the walls located at the closed end of the V-shaped guide portion 90 may be integral with each other via a base portion 93, or the walls may be individually connected to the band portion 72. The portion of the walls located at the open end of the V-shaped guide portion may have a flared portion 94. The flared portion may extend in a direction substantially parallel to the band portion. The flared portion permits a tube portion to be contacted without denting thereof The flared portion 94 also facilitates a tube flange being guided into the V-shaped guide portion 90 without the retainer portion becoming hooked or snagged on the tube flange. The walls 92 may be of a predetermined length so that the flared portions 94 rest on (or engage) the outer walls of the fastened tubes adjacent to the flanges when clamping is complete. That is, the walls 92 may have a length with respect to a flange length which positions the walls radially outward from or on the outer surface of the tube when in the operative position. In an exemplary embodiment the arms are of an equal length and contribute to the flanges being axially and circumferentially aligned in a sealed manner. Other exemplary embodiments may have the guide portion comprised of spaced walls with substantially straight end portions (e.g., FIG. 11) or with substantially rounded end portions (e.g., FIG. 12).

The walls 92 of the exemplary embodiment act to guide and align the flanges during tightening of the clamp apparatus thereon. The relatively angled walls permit the clamp apparatus to provide a substantially constant force about the circumference of the flanges. The tapering allows at least one flange to be longitudinally urged toward the other flange. That is, at least one flange can be moved in the direction of its longitudinal axis toward the other flange.

Thus, the tapering permits the respective flange faces 50, 52 to be brought into abutting contact. The tapering also allows at least one flange to be circumferentially directed toward the other flange. That is, the tapering permits the respective outer circumferential edges 54, 56 of the flanges to be aligned. The clamping process of the exemplary embodiment also permits the clamping together of two flanges having different materials and/or different sizes, e.g., somewhat different diameters and/or different widths. The exemplary embodiment further achieves alignment of the walls bounding the inner surfaces of the adjacent tube portions. Further, the exemplary embodiment provides for joining the adjacent tube portions with minimum gaps between the adjacent inner surfaces. This minimizes the risk of a passing carrier becoming caught in the area of the joint or of prematurely wearing or damaging the seals on the carrier as it passes through the joint.

The exemplary retainer portion 74, when the clamp is tightened on the flanges, also operates to structurally hold, capture, secure, fasten, or retain the flanges relative to the clamp apparatus and each other, as shown in FIG. 10.

The clamp apparatus may include a plurality of retainer portions. In an exemplary embodiment the clamp apparatus includes three retainer portions. Of course in other embodiments more or fewer than three retainer portions may be used. The retainer portions can be circumferentially spaced relative to each other to permit the band portion to be more readily opened to receive adjacent flanges. While the clamp apparatus is opened, there are gaps 96 between adjacent but non contacting retainer portions and a gap 95 adjacent the adjusting device 76. In an exemplary embodiment, during clamp tightening resulting in the band portion diameter being reduced, the radially inner surfaces of each retainer portion adjacent a gap 96 may be drawn closer to an adjacent retainer surface. Further, during tightening of the clamp apparatus, gap 95 closes as the adjacent retainer portions move closer together. A limit on the tightening of the clamp apparatus is reached upon the gaps 95 or 96 being closed to the point of metal to metal contact between adjacent retainer portions.

The base portion 93 (or the band portion intermediate the two arms) may be of a predetermined length to substantially correspond to the combined widths of the outer circumferential edges 54, 56 of the first and second flanges. In such an embodiment, when the flange edges reach the base portion then clamping is complete. In other embodiments the flange edges may not have to contact the base portion in order to complete the clamping process. In other embodiments other configurations and relationships may be employed including cross-sectional contours of the flanges that facilitate clamping and sealing.

In an exemplary embodiment, a seal portion 100 comprised of resilient material maybe placed intermediate the band portion 72 and the first and second Ranges in order to provide the flanges in clamped sealing relationship. A seal may be used with the clamp to prevent pressure leakage through the fastened joint. Thus, not only can the clamping process of the exemplary embodiment result in guiding and aligning and retaining of tube flanges, but also the sealing thereof.

Figure 6:
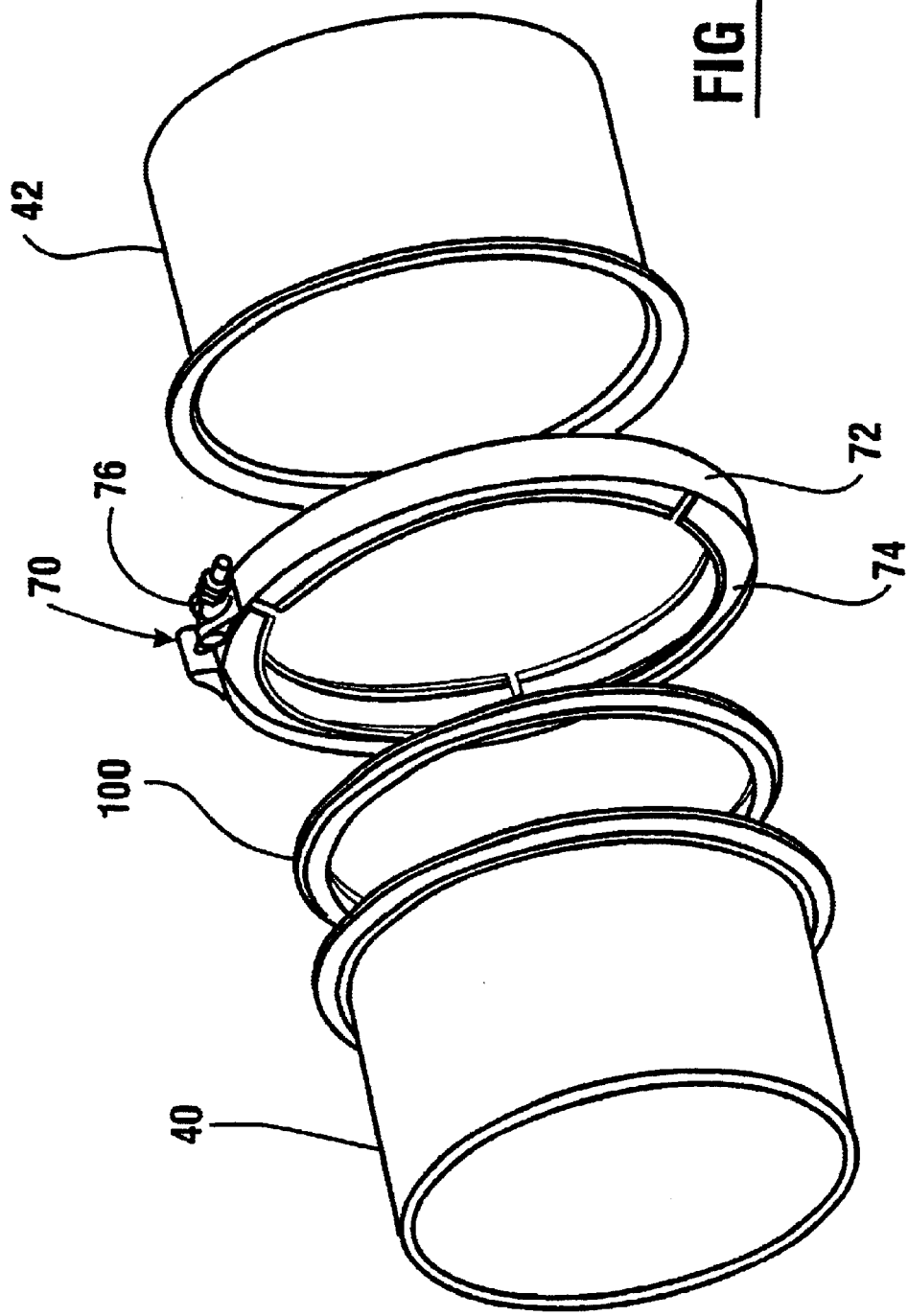
FIG. 6 shows the exemplary pneumatic tubes, a seal, and a clamp apparatus prior to fastening of the tubes.

FIG. 6 shows an arrangement of tubes 40, 42, a seal portion 100, and a clamp apparatus 70 prior to fastening. FIG. 7 shows a further stage of fastening involving the tube flanges 44, 46, a seal portion 100, and a retainer portion 74. The exemplary seal portion 100 may comprise a circumferentially continuous cylindrical seal portion. The seal portion may comprise an elastic seal or a hard plug-like seal. Of course other types of sealing may be used. For example, the seal portion may include a plurality of individual sealing portion components. Additionally, a seal portion may include the use of a semi-fluid or room temperature vulcanizing sealant. Furthermore, the seal portion may include more than one seal (e.g., more than one layer of seals) and/or a combination of different seals. A seal portion may also be embedded therein or integral with a retainer portion, band portion, or flange. Additionally, a seal portion may be preformed (e.g., wedge shaped) to correspond to and better fit the shape (e.g., V-shape) of a retainer portion. A seal portion may also assume a desired configuration due to deformation (e.g., compacting, bending, heating) of a retainer portion or band portion.

In alternative embodiments the clamp apparatus may also be used without inserting a separate seal. The curvatures of the circumferential edges 54, 56 and the curvature of the base portion 93 (or the band portion intermediate the two walls) may be equally sized so that when the clamp is in a tightened state the abutting curvatures produce a seal. That is, the clamping may result in the circumferential flange edges 54, 56 sealingly abutting the base portion 93 (or the band portion intermediate the two arms).

In exemplary embodiments during tightening of the clamp apparatus, the seal portion 100 may become compressed between the band portion 72 and the flanges 44, 46. Furthermore, the seal portion may be compressed intermediate the band portion, the retainer portion, and the flanges. In an exemplary embodiment, after clamping is completed, a seal is created at a joint 98 which is between the flanges 44, 46, as shown in FIG. 8. The seal portion 100 may abut the base portion 93 or the band portion intermediate the two walls 92. Additionally, or alternatively, a seal portion 101 may be positioned intermediate the first and second flanges, e.g., in a portion of a gap located between the faces of non-abutting adjacent flanges, such as shown in FIG. 9.

With the application of a negative pressure in the pneumatic tubing, the sealing of the flanges to each other may be enhanced. For example, a negative pressure within the joined tubing would attempt to draw or pull the seal (and clamp) toward the joint 98 abutting the flanges. Thus, a negative pressure could help create or ensure a self-sealing arrangement. Use of assembled pneumatic tubing with the application of a negative pressure therein may result in less sealing material or less clamping force being needed to accomplish proper sealing, in comparison to use with positive pressure systems. A negative pressure may be applied during the tightening process to determine when ample tightening was obtained. That is, an interior negative pressure itself may radially maintain (e.g., via suction) the seal portion without the clamp needing to radially secure the seal portion. Thus, the clamp may be only required to apply enough force to transversely secure the seal portion. It follows that after a negative pressure is created, and the seal portion is radially fixed in a sealing position by the negative pressure, then it may be possible to allow the clamp to loosen during service without adverse effects. Such loosening may extend the life of the clamp. Other embodiments may include automated devices for automatically tightening and/or loosening an adjusting device. Such devices may be used to compensate for factors such as changes in temperature or shifting of system components. In some embodiments suitable actuators may be used.

The seal provided may be tested for leakage (e.g., leakage or degradation of a negative pressure). The leakage testing may involve a pressure test. In an exemplary embodiment, a pneumatic transfer system using pneumatic tubing flanges sealed by the process disclosed herein is enabled to selectively move a carrier between a service provider station and a customer station with the use of a vacuum in the tubing.

In an exemplary embodiment of fastening operation, the clamp 70 is positioned adjacent a first tubing flange 44 and a second tubing flange 46, such as shown in FIG. 6. At least a portion of the first flange and at least a portion of the second flange are then disposed between spaced walls 86 of the retainer portion 74 of the clamp 70, such as shown in FIG. 7. A seal portion 100 can be arranged intermediate the band portion 72 and the flanges 44, 46.

The seal portion 100 is arranged to circumferentially surround the first outer circumferential edge 54 and second outer circumferential edge 56 of the respective flanges. Of course the seal portion 100 may be positioned in this flange surrounding position in various embodiments a plurality of different ways, such as by surrounding a first edge with the seal portion, then surrounding a second edge with the seal portion, and then positioning the clamp thereon; simultaneously surrounding the edges with the seal portion, then positioning the clamp; or placing the seal portion between the spaced walls 86 prior to positioning the clamp apparatus on the flanges. That is, the seal portion may be arranged in surrounding relation relative to the flanges prior to clamp positioning, or the seal portion may be applied with the clamp during clamp positioning. Furthermore, if the clamp is open large enough then the seal portion may be inserted after the clamp already surrounds the flanges.

The clamp apparatus 70 can be tightened by rotating the nut 84 of the adjusting device 76 to draw the ends of the band portion 72 closer together. If plural retainer portions are used, then the tightening of the clamp can also draw adjacent retainer portions adjacent gap 95 circumferentially closer together. With the first flange and second flanges disposed between the spaced walls 86 of the retainer portion 74, the tightening of the clamp urges the flanges in toward both longitudinal and circumferential abutting contact and alignment. That is, responsive to the clamp tightening, the taper of the retainer portion 74 produces guiding and alignment of the flanges. The tightening of the exemplary clamp apparatus results in the flanges being moved toward each other. The tightening of the clamp apparatus also results in the flanges being moved relative to each other toward circumferential alignment. Therefore, the clamp apparatus can be used to efficiently move the flanges in both the longitudinal axis direction and the radial direction, i.e., in at least two different (and perpendicular) directions. As previously discussed, the retainer portion can also retain the flanges in alignment relative to each other.

FIGS. 8 and 9 show fastened flanges in accordance with exemplary embodiments. FIG. 8 shows flanges fastened in abutting relationship and circumferential alignment. FIG. 9 shows aligned fastened flanges with a seal portion partly in the gap between flange faces. FIG. 10 shows another view of joined pneumatic tube portions. Thus, the exemplary forms of the present invention can be used to align and sealingly fasten the pneumatic tube portion so that a differential pressure may be used therein to move a carrier.

In another exemplary embodiment of the tube joining process, the same sized clamp apparatus may be used with tubing sections of various diameters. This enables use of a single sized clamp apparatus for use with different sized tubing without having to make extensive modifications to the clamp apparatus. The circumferential spacing of plural retainer portions in the clamp apparatus may permit a single clamp apparatus to be used with various diameter tubes. Additionally, in other embodiments multiple circumferential gaps between retainer portions in a clamp apparatus may be made adjustable to enable even a wider range of multisized usages of a particular clamp. For example, the retainer portions may be circumferentially extended or shortened (e.g., telescopically). Further, the retainer portions may be replaceable with different sized retainer portions, e.g., the retainer portions may be removably attachable to the band portion. The band portion may include grooves or slots for removable attachment of retainer portions thereto. Additional embodiments may have the retainer portions freely slidable relative to each other and the band portion. Thus, the final spacing (after clamping is completed) between retainer portions could be determined by the exerted clamping force. Alternative embodiments may have the adjusting device removably positionable at different locations on the band portion. This would enable the band portion to conform to different sized tubing. The open ends of the band portion may be capable of being overlapped. The open ends may further be lengthened or shortened through use of end extenders removably attachable to the band portion. Of course other embodiments of the invention may be utilized where different types of pneumatic transfer systems and carrier designs are implemented.

As heretofore discussed, exemplary forms of the present invention permit enhanced ease of tubing assembly because the clamp serves to align the tubes during joining. Prior art steps requiring circumferential alignment prior to applying a clamp are rendered unnecessary by the novel clamping process which may be achieved with forms of the present invention. Further, the exemplary method of the present invention avoids the need for manually aligning tubing during clamping operations. This is particularly useful where the tubing assembly location provides limited work space. Hence, less time and labor may be required. The exemplary forms of the present invention also enables the quicker clamping together of larger and heavier pneumatic tubes than was achieved through the use of conventional clamping methods. As previously discussed, the exemplary clamping process results in numerous advantages, including the guiding, aligning, sealing, and retaining of tube portions. Thus, the exemplary embodiments or the present invention result in a more economic and efficient process of fastening pneumatic tubes.

Thus, the new pneumatic tube fastening process of the exemplary form of the present invention achieves the above-stated objectives, eliminates difficulties encountered in the use of prior methods, solves problems, and attains the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations given herein are by way of examples and the invention is not limited to the exact details shown or described. In addition, any feature of the invention that is described in the following claims as a means for performing a function shall be construed as encompassing any means capable performing the recited function and shall not be deemed limited to the means disclosed in the foregoing description or mere equivalents thereof.

Having described the features, discoveries and principles of the invention, the manner in which it is constructed, utilized and operated, and the advantages and useful results attained, the new and useful structures, devices, elements, arrangements, parts, combinations, systems, equipment, operations, methods, and relationships are set forth in the appended claims.

I claim:

1. A method of joining pneumatic tube portions with a clamp apparatus for use in pneumatically transporting a carrier therein between user stations, wherein the pneumatic tubing includes a first pneumatic tube portion having a first flange and a second pneumatic tube portion having a second flange, wherein the first flange has a first circumference and the second flange has a second circumference, wherein the first flange has a first longitudinal axis and the second flange has a second longitudinal axis, wherein the clamp apparatus includes a circumferential band portion and at least one retainer portion and an adjusting device in operative connection with the band portion, wherein each retainer portion includes in cross section a pair of spaced walls at least one of which includes a tapered portion, the method comprising:

(a) positioning the clamp apparatus adjacent the first flange and the second flange, wherein at least a portion of the first flange and at least a portion of the second flange are disposed between the spaced walls;

(b) tightening the adjusting device, wherein the tapered portion longitudinally guides the first flange and the second flange toward abutting relationship, and wherein the at least one retainer portion guides the first flange and the second flange toward circumferential alignment, and subsequent to step (b) moving a carrier through the joined first and second tube portions responsive to pneumatic pressure.

2. The method according to claim 1 wherein the tightening further includes pneumatically sealing the first flange with the second flange.

3. The method according to claim 1 and prior to (b), further comprising:

(c) positioning a seal portion intermediate the band portion and the first and second flanges.

4. The method according to claim 3 wherein (c) includes positioning a circumferentially continuous seal portion intermediate the band portion and the first and second flanges.

5. The method according to claim 3 wherein the retainer portion includes in cross section a V-shaped guide portion, wherein (b) includes guiding the first flange and the second flange with the V-shaped guide portion.

6. The method according to claim 5 wherein the V-shaped guide portion includes two tapered walls, wherein (c) includes positioning the seal portion intermediate the two walls.

7. The method according to claim 6 wherein during the tightening the seal portion is compressed intermediate the band portion, the first flange, the second flange, and the two walls.

8. The method according to claim 1 and prior to (b), further comprising:

(c) positioning a seal portion intermediate the first and second flanges.

9. The method according to claim 1 wherein the retainer portion includes in cross section a V-shaped guide portion, wherein (b) includes guiding the first flange and the second flange with the V-shaped guide portion.

10. The method according to claim 9 wherein during the tightening the V-shaped guide portion wedges the first flange and the second flange into abutting relationship.

11. The method according to claim 9 wherein during the tightening the V-shaped guide portion substantially aligns the first edge and the second edge.

12. The method according to claim 1 wherein during the tightening the first longitudinal axis and the second longitudinal axis are axially aligned.

13. The method according to claim 1 wherein responsive to the tightening the first flange and the second flange are secured to each other.

14. The method according to claim 1 wherein the retainer portion is operatively connected to the band portion.

15. The method according to claim 1 wherein the retainer portion is integral with the band portion.

16. The method according to claim 1 wherein the first flange comprises a first flared tubing portion on the first pneumatic tube portion, and wherein the second flange comprises a second flared tubing portion on the second pneumatic tube portion, and wherein during the tightening the first and second fared tubing portions are directed toward abutting relationship and circumferential alignment.

17. The method according to claim 1 and comprising a plurality of retainer portions, and wherein (a) includes positioning the clamp apparatus with the adjacent retainer portions spaced from each other.

18. The method according to claim 17 wherein during the tightening at least two adjacent retainer portions are caused to abut each other.

19. The method according to claim 1 wherein the clamp apparatus includes at least three retainer portions, wherein prior to (b) the retainer portions are circumferentially spaced from each adjacent retainer portion, and wherein responsive to the tightening each retainer portion is moved towards two adjacent retainer portions.

20. The method according to claim 1 wherein during the tightening the retainer portion contacts both the first flange and the second flange.

21. The method according to claim 20 wherein the first flange and second flange and the retainer portion are each comprised of metal, and wherein during the tightening the metal retainer portion simultaneously contacts the first and second metal flanges.

22. The method according to claim 1 wherein the first flange has a first flange face and the second flange has a second flange face, wherein the first flange has a first outer circumferential edge and the second flange has a second outer circumferential edge, and wherein (b) includes tightening the adjusting device, wherein the tapered portion longitudinally urges the first flange face and the second flange face toward abutting relationship, and wherein the at least one retainer portion urges the first edge and the second edge toward circumferential alignment.

23. The method according to claim 22 wherein the first circumference is substantially equal to the second circumference, and wherein (b) includes abutting the first flange face with the second flange face.

24. The method according to claim 22 wherein the first circumference is substantially equal to the second circumference, and wherein (b) includes substantially aligning the first edge and the second edge.

25. The method according to claim 3 and subsequent to (b), further comprising:

(d) creating a differential pressure in the pneumatic tubing.

26. The method according to claim 25 and subsequent to (d), further comprising:

(e) testing the fusing for leakage.

27. The method according to claim 25 and further comprising:

(e) transporting the carrier in the pneumatic tubing by differential pressure between a service provider station and a customer station.

28. A method of fastening pneumatic tubing portions with a clamp apparatus for use in pneumatically transporting a carrier therein between user stations, comprising:

(a) arranging a metallic band portion in circumferentially surrounding relationship relative to a first flared pneumatic metal tube flange of a first tube portion and a second flared pneumatic metal tube flange of a second tube portion, wherein the first flange has a first longitudinal axis and the second flange has a second longitudinal axis, wherein the band portion includes an outer circumference, wherein the band portion include at least one retainer having a V-shape in cross section, wherein the V-shaped retainers extend radially inward of the band portion, and wherein the V-shaped retainers are circumferentially spaced from each other;

(b) positioning a circumferential seal portion intermediate the band portion and the first and second flanges;

(c) tightening the band portion to align and seal and hold the first flange with the second flange, wherein the V-shaped retainers contact and longitudinally urge the first flange and the second flange toward abutting relationship, and wherein the V-shaped retainers contact and urge the first flange and the second flange toward circumferential alignment; and (d) passing a carrier through the first and second tube portions responsive to pneumatic pressure.

29. The method according to claim 28 wherein during the tightening the first longitudinal axis and the second flange are axially aligned.

30. The method according to claim 28 wherein during the tightening the V-shaped retainers wedge the first flange and the second flange into abutting relationship.

31. The method according to claim 28 wherein during the tightening at least two V-shaped retainers abut each other.

32. The method according to claim 28 and further comprising:

(d) subsequent to (c), providing a differential pressure in a conduit including the first tube portion and the second tube portion.

33. The method according to claim 32 and further comprising:

(e) transporting a carrier in the conduit responsive to the differential pressure between a service provider station and a customer station.

34. The method according to claim 28 and further comprising:

(d) providing a radially inward directed force on the seal responsive to pneumatic pressure.

* * * * *